United States Patent
Wang et al.

(10) Patent No.: US 11,197,320 B2
(45) Date of Patent: Dec. 7, 2021

(54) UPLINK TRANSMISSION RESOURCE SCHEDULING METHOD AND DEVICE, AND UPLINK TRANSMISSION METHOD AND DEVICE

(71) Applicant: CHINA ACADEMY OF TELECOMMUNICATIONS TECHNOLOGY, Beijing (CN)

(72) Inventors: Jiaqing Wang, Beijing (CN); Xueming Pan, Beijing (CN); Weijie Xu, Beijing (CN); Qianqian Si, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 15/763,091

(22) PCT Filed: Aug. 25, 2016

(86) PCT No.: PCT/CN2016/096734
§ 371 (c)(1),
(2) Date: Mar. 23, 2018

(87) PCT Pub. No.: WO2017/050087
PCT Pub. Date: Mar. 30, 2017

(65) Prior Publication Data
US 2018/0279347 A1    Sep. 27, 2018

(30) Foreign Application Priority Data
Sep. 25, 2015    (CN) .......................... 201510625037.8

(51) Int. Cl.
*H04W 74/08*    (2009.01)
*H04W 72/04*    (2009.01)
(Continued)

(52) U.S. Cl.
CPC ... *H04W 74/0816* (2013.01); *H04W 72/0446* (2013.01); *H04W 72/1284* (2013.01);
(Continued)

(58) Field of Classification Search
CPC ................................................. H04W 74/0816
See application file for complete search history.

(56) References Cited

U.S. PATENT DOCUMENTS

2014/0036853 A1    2/2014   Kim et al.
2014/0362780 A1    12/2014  Malladi et al.
(Continued)

FOREIGN PATENT DOCUMENTS

CN    102378373 A    3/2012
CN    102801506 A    11/2012
(Continued)

OTHER PUBLICATIONS

IP Office of P.R. China—International Search Report of the International Searching Authority (with English Translation) dated Nov. 18, 2016 for International Application No. PCT/CN2016/096734 (5 pgs).
(Continued)

*Primary Examiner* — Jason E Mattis
(74) *Attorney, Agent, or Firm* — Womble Bond Dickinson (US) LLP

(57) ABSTRACT

Disclosed are an uplink transmission resource scheduling method and device, and an uplink transmission method and device, which are used for reserving an uplink transmission resource on an unlicensed carrier, enabling a user equipment (UE) not to transmit an uplink signal on the reserved resource and avoiding a case in which the scheduled UE cannot access a channel, and can realize time division multiplexing of uplink transmission resources on the unlicensed carrier. An uplink transmission resource scheduling
(Continued)

S101 — A base station determines a resource to be reserved in an uplink sub-frame, where the resource to be reserved is a transmission resource over an unlicensed carrier S102 — The base station sends a notification of the resource to be reserved in the uplink sub-frame to a UE method provided by the present application comprises: a base station determines a reserved resource in an uplink subframe, the reserved resource being a transmission resource on an unlicensed carrier; and the base station sends a notification about the reserved resource in the uplink subframe to a UE.

12 Claims, 6 Drawing Sheets

(51) Int. Cl.
  *H04W 72/12* (2009.01)
  *H04W 72/14* (2009.01)
  *H04W 74/00* (2009.01)
(52) U.S. Cl.
  CPC ....... *H04W 72/14* (2013.01); *H04W 74/0808* (2013.01); *H04W 72/1289* (2013.01); *H04W 74/006* (2013.01)

(56) References Cited

U.S. PATENT DOCUMENTS

| | | | |
|---|---|---|---|
| 2015/0085797 A1 | 3/2015 | Ji et al. | |
| 2015/0099525 A1 | 4/2015 | Ji et al. | |
| 2017/0041805 A1* | 2/2017 | Chandrasekhar | H04W 74/0816 |
| 2017/0111801 A1* | 4/2017 | Tomeba | H04J 1/00 |
| 2017/0280331 A1* | 9/2017 | Gou | H04L 5/0007 |
| 2017/0339717 A1* | 11/2017 | Futaki | H04W 16/14 |
| 2018/0270834 A1* | 9/2018 | Falconetti | H04B 17/345 |
| 2018/0310332 A1* | 10/2018 | Ahn | H04W 74/0816 |
| 2021/0204310 A1* | 7/2021 | Lei | H04W 72/1273 |

FOREIGN PATENT DOCUMENTS

| | | |
|---|---|---|
| CN | 103229582 A | 7/2013 |
| CN | 104301273 A | 1/2015 |
| CN | 104540230 A | 4/2015 |
| KR | 1020140010450 A | 1/2014 |
| WO | WO 2015116159 A1 | 8/2015 |

OTHER PUBLICATIONS

IP Office of P.R. China—Written Opinion of the International Searching Authority (with English Translation) dated Nov. 18, 2016 for International Application No. PCT/CN2016/096734 (7 pgs).
Extended European Search Report; for counterpart EP Application No. 16847969.9 11 pgs. (dated Aug. 23, 2018).
3GPP, "CATT: listen before talk for LAA," XP050885328, 3GPP Draft, R1-144625, 3GPP TSG RAN WG1 Meeting #79, vol. RAN WG1, No. Sas Francisco, USA, Nov. 17, 2014-Nov. 21, 2014, 6 pgs. (Nov. 8, 2014).
3GPP, "ETRI: Discussion on UL grant for LAA," XP050934943, 3GPP Draft, R1-152095, 3GPP TSG RAN WG1 Meeting #80bis, vol. RAN WG1, No. Belgrade, Serbia, Apr. 20, 2015-Apr. 24, 2015, 5 pgs. (Apr. 19, 2015).
3GPP, "Intel Corporation: Uplink transmission with LBT," XP050936083. 3GPP Draft, R2-151102, 3GPP TSG-RAN WG2 #89bis, vol. RAN WG2, No. Bratislava, Slovakia, Apr. 20, 2015-Apr. 24, 2015, 6 pgs. (Apr. 19, 2015).
Chinese Office Action in application No. 201510625037.8; dated Dec. 17, 2018.
Korean Office Action in application No. 10-2018-7011759; dated May 31, 2019.
The International Preliminary Report on Patentabilty of PCT Application No. PCT/CN2016/096734, dated Mar. 27, 2018, 4 pages.
Perahia, Eldad and Stacey, Robert. "Next Generation Wireless LANS Throughput, Robustness, and Reliability in 802.11n," Cambridge University Press, Aug. 28, 2008.

* cited by examiner

UPLINK TRANSMISSION RESOURCE SCHEDULING METHOD AND DEVICE, AND UPLINK TRANSMISSION METHOD AND DEVICE

CROSS-REFERENCE TO RELATED APPLICATIONS

This patent application is a U.S. National Phase application under 35 U.S.C. § 371 of International Application No. PCT/CN2016/096734, filed on 25 Aug. 2016, entitled UPLINK TRANSMISSION RESOURCE SCHEDULING METHOD DEVICE, AND UPLINK TRANSMISSION METHOD AND DEVICE, which claims the benefit of priority from Chinese Patent Application No. 201510625037.8, filed with the Chinese Patent Office on Sep. 25, 2015 and entitled "Method and apparatus for scheduling an uplink transmission resource, and method and apparatus for uplink transmission", which was incorporated by reference in its entirety.

FIELD

The present application relates to the field of communications, and particularly to a method and apparatus for scheduling an uplink transmission resource, and a method and apparatus for uplink transmission.

BACKGROUND

As there is a constantly growing amount of mobile data traffic, spectrum resources are increasingly insufficient, and the demand for the amount of traffic may have failed to be satisfied by deploying a network, and transmitting the traffic, only over licensed spectrum resources, so transmission may be deployed over unlicensed spectrum resources in a Long Term Evolution (LTE) system, where this LTE system can be referred to as Unlicensed LTE (or simply U-LTE or LTE-U), to thereby improve the experience of a user equipment, and extend a coverage area. However there has been absent so far a specific solution to how the LTE system operates over an unlicensed spectrum resource.

There is no particular application system planned in any unlicensed spectrum, so the unlicensed spectrum can be shared by various wireless communication systems, e.g., Bluetooth, Wireless Fidelity (WiFi), etc., where the systems access the shared unlicensed spectrum resources by pre-empting the resources. Accordingly the coexistence between LTE-U systems deployed by different operators, and between an LTE-U system and a WiFi or another wireless communication system has been studied as a focus. As specified by the 3GPP, an LTE-U system and a WiFi or another wireless communication system shall coexist in a fair mode, where an unlicensed frequency band operates as a secondary carrier with the assistance of a primary carrier in a licensed frequency band. Unlike the LTE system in the licensed frequency band, a User Equipment (UE) in the LTE-U system in the unlicensed frequency band needs to operate in the Listen Before Talk (LBT) mode, before the UE transmits data, and when the unlicensed frequency band operates in the time division multiplexing mode, the UE transmitting a signal will be sure to block a subsequently scheduled UE from accessing a channel.

In summary, there has been absent in the prior art a solution to scheduling and accessing an unlicensed spectrum resource.

SUMMARY

Embodiments of the application provide a method and apparatus for scheduling an uplink transmission resource, and a method and apparatus for uplink transmission so as to reserve an uplink transmission resource over an unlicensed carrier, so that a UE will not transmit any uplink signal over the reserved resource, to thereby avoid the scheduled UE from failing to access a channel, and so as to access the uplink transmission resource over the unlicensed carrier in a time division multiplexing mode.

An embodiment of the application provides a method for scheduling an uplink transmission resource, the method including:

determining, by a base station, a resource to be reserved in an uplink sub-frame, wherein the resource to be reserved is a transmission resource over an unlicensed carrier; and sending, by the base station, a notification of the resource to be reserved in the uplink sub-frame to a UE.

With this method, the base station determines the resource to be reserved in the uplink sub-frame, where the resource to be reserved is a transmission resource over the unlicensed carrier; and the base station sends the notification of the resource to be reserved in the uplink sub-frame to the UE, so that the uplink transmission resource over the unlicensed carrier is reserved, thus the UE will not transmit any uplink signal over the resource to be reserved, to thereby avoid a scheduled UE from failing to access a channel, and the uplink transmission resource over the unlicensed carrier can be accessed in a time division multiplexing mode.

Optionally the base station sends the notification of the resource to be reserved in the uplink sub-frame to the UE semi-statically or dynamically.

Optionally when the base station sends the notification of the resource to be reserved in the uplink sub-frame to the UE semi-statically, sending, by the base station, the notification of the resource to be reserved in the uplink sub-frame to the UE via non-physical layer signaling; or when the base station sends the notification of the resource to be reserved in the uplink sub-frame to the UE dynamically, sending, by the base station, the notification of the resource to be reserved in the uplink sub-frame to the UE via physical layer signaling.

Optionally the resource to be reserved is used for the UE to perform Listen Before Talk (LBT) operations.

Optionally the notification carries one or a combination of:

an indicator that the UE needs to reserve the resource in the uplink sub-frame;

the uplink sub-frame including the resource to be reserved, and a position of the resource to be reserved in the uplink sub-frame; and a size of the resource to be reserved in the uplink sub-frame including the resource to be reserved.

Optionally the resource to be reserved is located at a head or a tail of at least one uplink sub-frame.

An embodiment of the application provides a method for uplink transmission, the method including:

determining, by a UE, a resource to be reserved in an uplink sub-frame, wherein the resource to be reserved is a transmission resource over an unlicensed carrier; and deciding, by the UE, not to transmit any uplink signal over the resource to be reserved.

Optionally the method further includes:

when the UE does not access a channel, perform, by the UE, Listen Before Talk (LBT) operations over the resource to be reserved; or when the UE accesses the channel, transmitting, by the UE, an uplink signal over an uplink resource scheduled by a base station.

Optionally the resource to be reserved in the uplink sub-frame is preconfigured; or the UE receives a notification of the resource to be reserved in the uplink sub-frame, sent semi-statically or dynamically by the base station, and determines from the notification the resource to be reserved in the uplink sub-frame.

An embodiment of the application provides an apparatus for scheduling an uplink transmission resource, the apparatus including:

a reserving unit configured to determine a resource to be reserved in an uplink sub-frame, wherein the resource to be reserved is a transmission resource over an unlicensed carrier; and a notification unit configured to send a notification of the resource to be reserved in the uplink sub-frame to a UE.

Optionally the notification unit is configured to send the notification of the resource to be reserved in the uplink sub-frame to the UE semi-statically or dynamically.

Optionally the notification unit is configured: when the notification unit sends the notification of the resource to be reserved in the uplink sub-frame to the UE semi-statically, to send the notification of the resource to be reserved in the uplink sub-frame to the UE via non-physical layer signaling; or when the notification unit sends the notification of the resource to be reserved in the uplink sub-frame to the UE dynamically, to send the notification of the resource to be reserved in the uplink sub-frame to the UE via physical layer signaling.

Optionally the resource to be reserved is used for the UE to perform Listen Before Talk (LBT) operations.

Optionally the signaling carries one or a combination of:

an indicator that the UE needs to reserve the resource in the uplink sub-frame;

the uplink sub-frame including the resource to be reserved, and a position of the resource to be reserved in the uplink sub-frame; and a size of the resource to be reserved in the uplink sub-frame including the resource to be reserved.

Optionally the resource to be reserved is located at the head or the tail of at least one uplink sub-frame.

An embodiment of the application provides an apparatus for uplink transmission, the apparatus including:

a first unit configured to determine a resource to be reserved in an uplink sub-frame, wherein the resource to be reserved is a transmission resource over an unlicensed carrier; and a second unit configured to decide not to transmit any uplink signal over the resource to be reserved.

Optionally the second unit is further configured:

when a UE including the apparatus does not access a channel, to perform Listen Before Talk (LBT) operations over the resource to be reserved; or when a UE including the apparatus accesses the channel, to transmit an uplink signal over an uplink resource scheduled by a base station.

Optionally the resource to be reserved in the uplink sub-frame, determined by the first unit is preconfigured; or the first unit receives a notification of the resource to be reserved in the uplink sub-frame, signaled semi-statically or dynamically by the base station, and determines from the notification the resource to be reserved in the uplink sub-frame.

DETAILED DESCRIPTION OF THE EMBODIMENTS

The embodiments of the application provide a method and apparatus for scheduling an uplink transmission resource, and a method and apparatus for uplink transmission so as to reserve an uplink transmission resource over an unlicensed carrier, so that a UE will not transmit any uplink signal over the reserved resource, to thereby avoid a scheduled UE from failing to access a channel, and so as to access the uplink transmission resource over the unlicensed carrier in a time division multiplexing mode.

Figure 1:
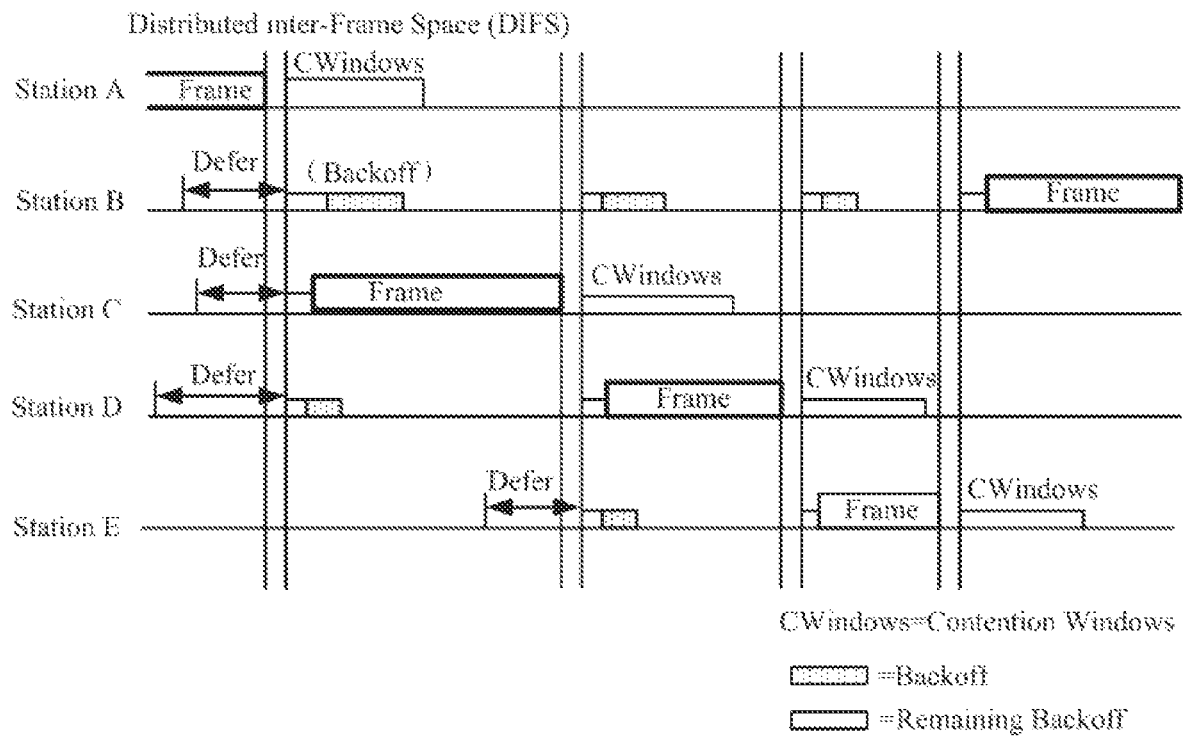
FIG. 1 is a schematic diagram of a WiFi system preempting a resource in an unlicensed spectrum according to an embodiment of the application.

The LBT in the embodiments of the application is general contention access means in the LTE-U system. Essentially in the LBT technology, an 802.11 system operates with the Carrier Sense Multiple Access with Collision Avoidance (CSMA/CA) mechanism, and the WiFi system preempts a resource in an unlicensed spectrum as illustrated in FIG. 1 as follows: firstly the WiFi system listens to a channel, and when the channel becomes clear in a Distributed inter-Frame Space (DIFS), it determines that the current channel is a clear channel, and then respective stations waiting for an access to the channel enter a random backoff stage, so that the stations can be avoided from colliding over the same resource. Moreover for the sake of fairness, none of the stations can occupy any spectrum resource for a long period of time, but shall release the resource after some period of time elapses, or an upper limit of the amount of transmitted data is reached, so that the resource can be preempted by another WiFi or LTE system.

In order to provide a flexible, fair, and adaptive channel access mechanism, the LBT technology is required in Europe to be applied in the unlicensed frequency bands of 5150-5350 MHz, and 5470-5725 MHz. Clear Channel Assessment (CCA) determines whether there is a signal being transmitted over the current channel, as a result of energy detection to thereby determine whether the channel is occupied.

Figure 2:
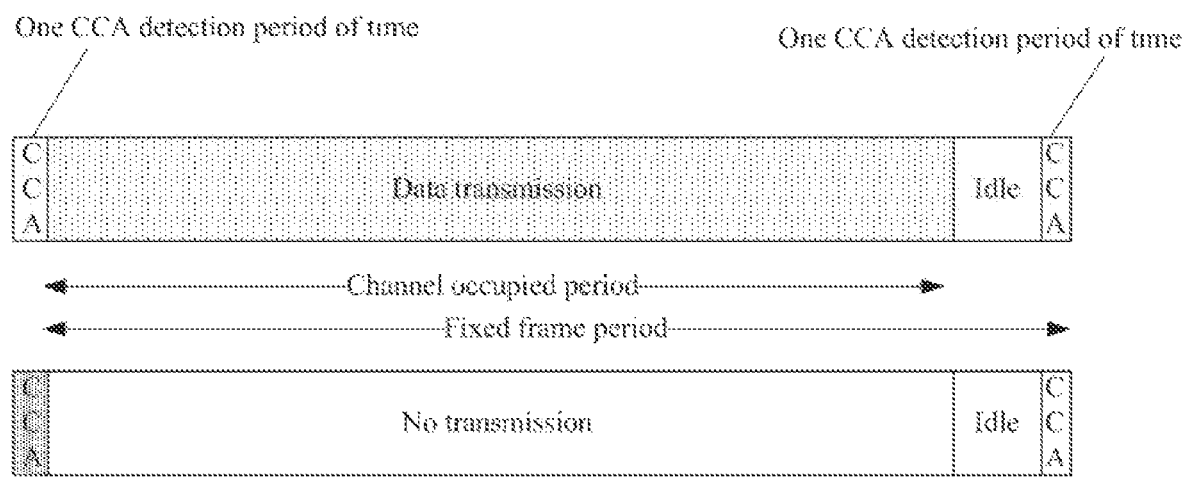
FIG. 2 is a schematic diagram of a channel access mechanism according to an embodiment of the application.
Figure 3:
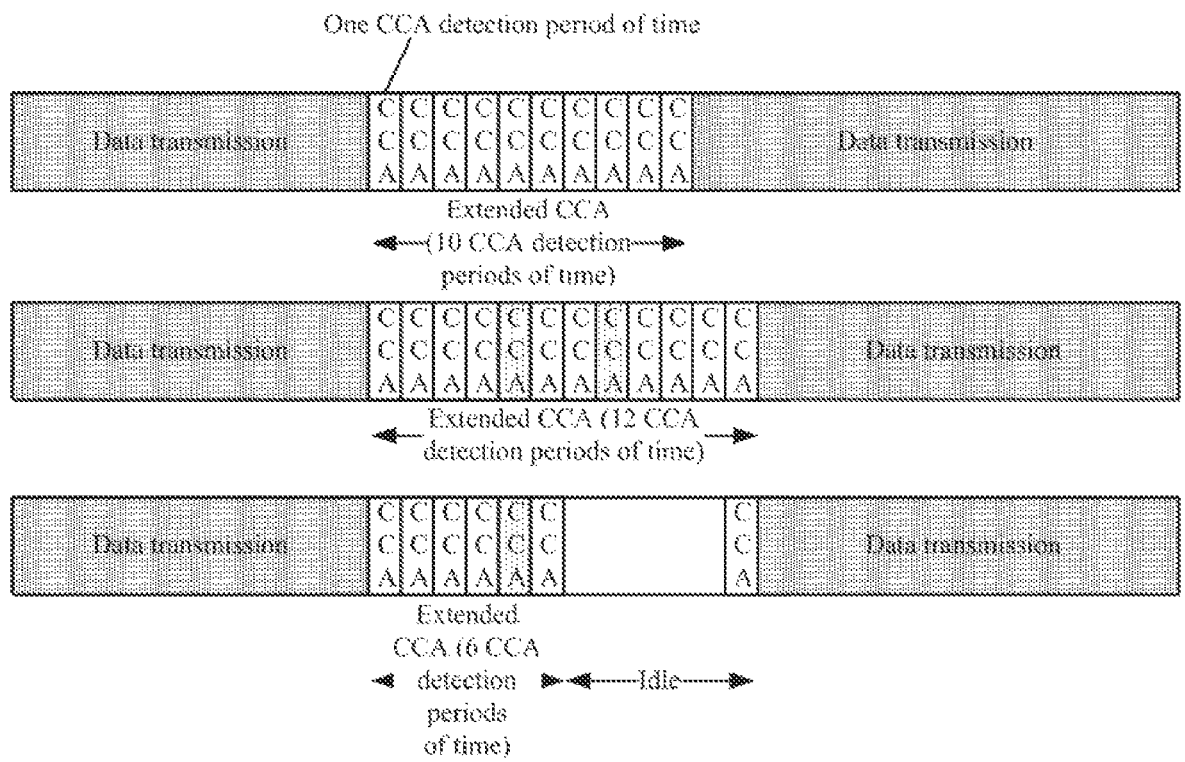
FIG. 3 is a schematic diagram of another channel access mechanism according to an embodiment of the application.

Two LBT modes in an unlicensed frequency band as illustrated respectively in FIG. 2 and FIG. 3 are specified in the European Telecommunication Standardization Institute (ETSI): a Frame Based Equipment (FBE) mode and a Load Based Equipment (LBE) mode.

Referring to FIG. 2, for an FBE access, CCE detection is performed at a fixed frame structure position, and once it is determined that the channel is idle for one CCA period (no less than 20 µs), the channel is accessed immediately, and a data transmission process is initiated, where there is a relatively fixed period of time, occupied for transmission over the channel, the minimum period of time is 1 ms, and the maximum period of time is 10 ms, an idle period of time shall be at least 5% of the period of time for which the channel is occupied, and the UE performs new CCA detection, and accesses the channel again, in a CCA period of time at the end of the idle period of time. The period of time for which the channel is occupied, plus the idle period of time in the FBE mechanism, is a fixed value referred to a frame period.

Referring to FIG. 3, the LBE access mechanism is similar to the CSMA/CA mechanism in the WiFi system in that a period of time for which, and a start point at which the channel is occupied by each transmission are varying, so extended CCA detection is performed before the channel is accessed, where firstly a random factor N is generated according to the size q of a Contention Window (CW), the channel will not be accessed until the channel has been idle for a period of time which is N times a CCA period of time, and then data transmission procedure is initiated; and the channel can be occupied for the largest length of time, which is 13 milliseconds (ms). There are two options A and B for the ESTI LBE, where there is a fixed contention window of the ESTI option B, and this is a general LBE form.

Figure 4:
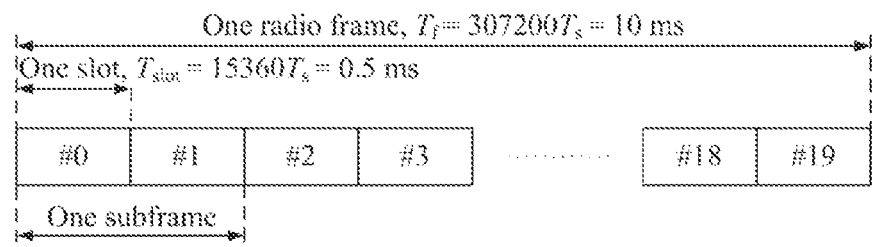
FIG. 4 is a schematic diagram of a first type of frame structure according to an embodiment of the application.
Figure 5:
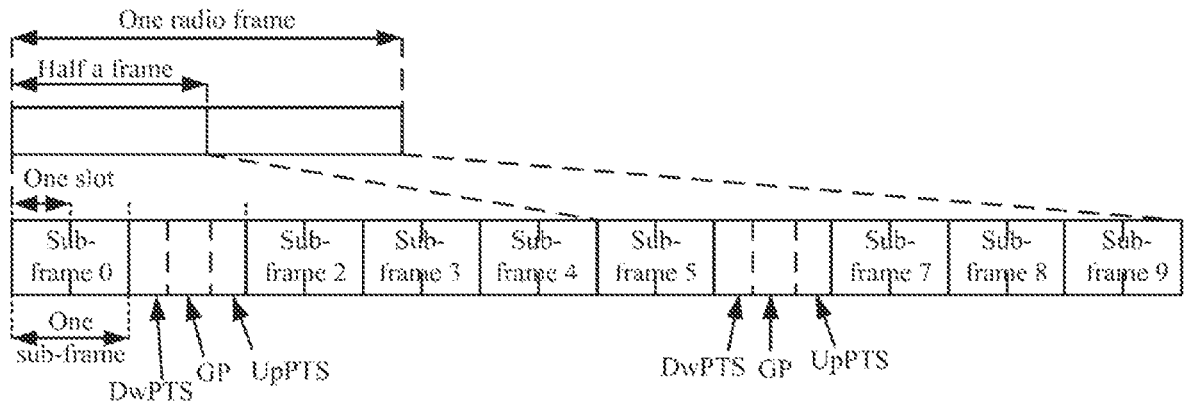
FIG. 5 is a schematic diagram of a second type of frame structure according to an embodiment of the application.

The LTE system supports two duplex modes of FDD and TDD, and different frame structures are applied to these two duplex modes. The two frame structures are common in that each radio frame includes 10 sub-frames of 1 ms. A first type of frame structure applied to an FDD system is as illustrated in FIG. 4, and a second type of frame structure applied to a TDD system is as illustrated in FIG. 5.

There are four categories of LBT currently defined in the 3GPP.

The LBT category 1 requires no LBT.

The LBT category 2 has a fixed backoff value, where no random backoff is required before a data burst is transmitted, but CCA detection is performed once, and then the channel is accessed; and the FBE is a special example of the LBT category 2.

Both the LBT category 3 and the LBT category 4 apply a random backoff value similar to that in the CSMA/CA mechanism, where there is a fixed contention window for the LBT category 3, and the ESTI LBE option B belongs to the LBT category 3.

The LBT category 4 is a modification to the ESTI LBE option B, where the load based LBT is applied thereto, and a contention window thereof is extended exponentially, or configured semi-statically. Since the contention window is extended exponentially in the WiFi system operating with the CSMA/CA access mechanism, in order to enable the LTE-U system to coexist with the WiFi system in a fair mode, the LBT category 4 shall be applied at least to downlink transmission in the LTE-U system as required in the 3GPP, and all of the four categories of LBT may be applicable to uplink transmission in the LTE-U system, so no conclusion has been made so far.

No matter whatever channel access mechanism is applied to uplink (UL) transmission, a scheduled UE may need to transmit in a time division multiplexing mode in a plurality of uplink transmission sub-frames. In one instance, for example, some UE transmits uplink data for a long period of time, e.g., in a plurality of sub-frames, and another UE only needs to transmit data in a very short period of time, e.g., in one sub-frame; and in another instance, if the maximum channel occupied time of a UE specified in some region or country is less than the number of configured uplink sub-frames, then different UEs transmit in the uplink sub-frames in the time division multiplexing mode becomes a problem that must be solved.

Unlike the LTE system in the licensed frequency band, the UE in the LTE-U system in the unlicensed frequency band needs to perform the LBT operation, before the UE transmits data, and when the LTE-U system operates in the time division multiplexing mode, the UE transmitting a signal will be sure to block a subsequently scheduled UE from accessing the channel. However, there has been absent at present a solution to how to perform the time division multiplexing for a plurality of UEs in the LTE-U uplink transmission, and how to reserve a resource for LBT for a new accessed UE when performing the time division multiplexing.

Accordingly the embodiments of the application provide a method for configuring a UE to reserve a resource for LBT or other operations, when a plurality of UEs operate in the uplink (UL) in a time division multiplexing mode in an unlicensed frequency band, and particular technical solutions thereof will be described as follows.

Figure 6:
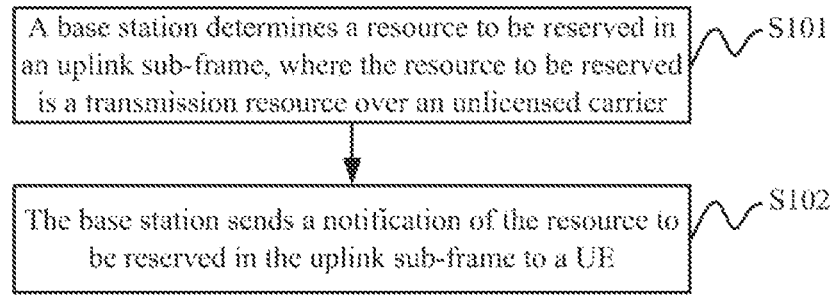
FIG. 6 is a schematic flow chart of a method for scheduling an uplink transmission resource according to an embodiment of the application.

Referring to FIG. 6, an embodiment of the application provides a method for scheduling an uplink transmission resource, where the method includes the following operations.

S101: A base station determines a resource to be reserved in an uplink sub-frame, where the resource to be reserved is a transmission resource over an unlicensed carrier.

S102: The base station sends a notification of the resource to be reserved in the uplink sub-frame to a UE.

With this method, the base station determines the resource to be reserved in the uplink sub-frame, where the resource to be reserved is a transmission resource over the unlicensed carrier; and the base station sends the notification of the resource to be reserved in the uplink sub-frame to the UE, so that the uplink transmission resource over the unlicensed carrier is reserved, so that the UE will not transmit any uplink signal over the resource to be reserved, to thereby avoid a scheduled UE from failing to access a channel, and the uplink transmission resource over the unlicensed carrier can be accessed in a time division multiplexing mode.

Here the resource to be reserved in the uplink sub-frame by a scheduled UE for LBT or other operations can be configured statically, semi-statically, or dynamically.

Optionally the base station sends the notification of the resource to be reserved in the uplink sub-frame to the UE semi-statically or dynamically.

Optionally when the base station sends the notification of the resource to be reserved in the uplink sub-frame to the UE semi-statically, the base station sends the notification of the resource to be reserved in the uplink sub-frame to the UE via non-physical layer signaling; or when the base station sends the notification of the resource to be reserved in the uplink sub-frame to the UE dynamically, the base station sends the notification of the resource to be reserved in the uplink sub-frame to the UE via physical layer signaling.

Optionally the resource to be reserved is used for a UE to perform Listen Before Talk (LBT) operations.

Optionally the notification carries one or a combination of: an indicator that the UE needs to reserve the resource in the uplink sub-frame; the uplink sub-frame including the resource to be reserved, and the position of the resource to be reserved in the uplink sub-frame; and the size of the resource to be reserved in the uplink sub-frame including the resource to be reserved.

Where the indicator that the UE needs to reserve the resource in the uplink sub-frame is provided as follows: for example, one bit is added to a UL grant to notify the UE whether to reserve a resource in a PUSCH scheduled by the UL grant (for example, a particular symbol resource to be reserved is either the last one or N symbols, or the first one or N symbols, all of these changes are applicable).

The size of the resource to be reserved in the uplink sub-frame including the resource to be reserved can be agreed on in advance, or can be signaled.

Optionally the resource to be reserved is located at the head or tail of at least one uplink sub-frame, and the resource to be reserved may be located in one or more uplink sub-frames, and may be located at the head(s), middle(s), or tail(s) of the uplink sub-frame(s).

For example, the base station and the UE configure an LBT sub-frame, and a resource for LBT in the LBT sub-frame once every N sub-frames. Of course, they can alternatively configure an LBT sub-frame at a varying interval, and the number of LBT sub-frames may alternatively be more than one.

Accordingly the UE does not transmit any signal over the corresponding resource to be reserved, as configured by the base station; any scheduled UE receiving correctly a UL grant (signaling applied in semi-static scheduling or dynamic scheduling) performs LBT operations over the resource to be reserved for LBT, as configured by the base station; and the UE accessing the channel transmits an uplink signal over a scheduled uplink resource.

Figure 7:
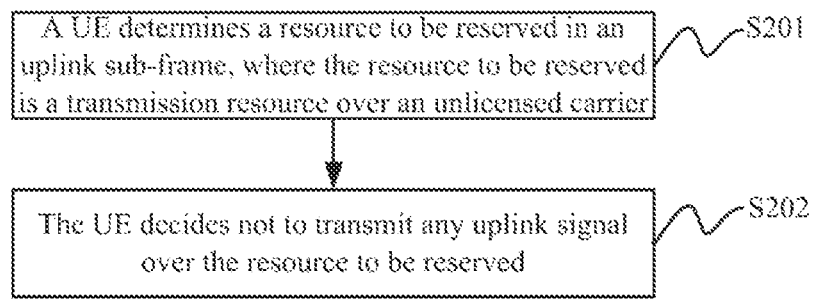
FIG. 7 is a schematic flow chart of a method for uplink transmission according to an embodiment of the application.

Referring to FIG. 7, an embodiment of the application provides a method for uplink transmission, where the method includes the following operations.

S201: A UE determines a resource to be reserved in an uplink sub-frame, where the resource to be reserved is a transmission resource over an unlicensed carrier.

S202: The UE decides not to transmit any uplink signal over the resource to be reserved.

Optionally the method further includes: when the UE does not access a channel, it performs Listen Before Talk (LBT) operations over the resource to be reserved; or when the UE accesses the channel, it transmits an uplink signal over an uplink resource scheduled by a base station.

Optionally the resource to be reserved in the uplink sub-frame is preconfigured; or the UE receives a notification of the resource to be reserved in the uplink sub-frame, sent semi-statically or dynamically by the base station, and determines from the notification the resource to be reserved in the uplink sub-frame.

Figure 8:
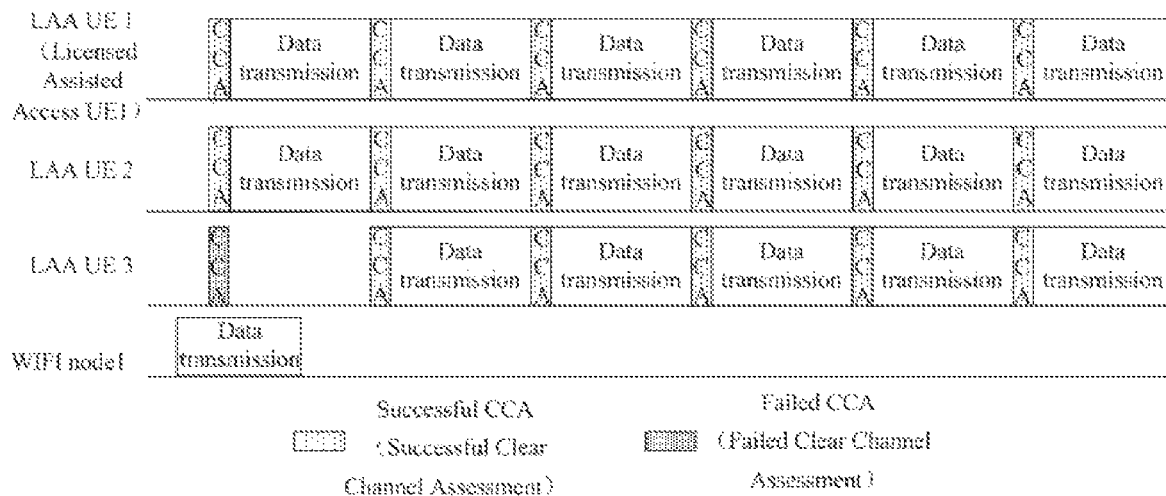
FIG. 8 is a schematic diagram of statically configured resources to be reserved, according to an embodiment of the application.

In an embodiment, if the resource to be reserved in the uplink sub-frame is configured statically, then the base station and the UE will agree on (instead of signaling to indicate) that a resource for LBT operations is reserved in all of uplink sub-frames or a subset of the uplink sub-frames (i.e., a part of the uplink sub-frames). Particularly they can agree on an uplink sub-frame including a resource for LBT to be reserved, where the sub-frame is defined as an LBT sub-frame (this definition will apply to all the embodiments, so a repeated description thereof will be omitted below), and agree on the resource for LBT operations to be reserved in these configured LBT sub-frames (at least the position and the size thereof). As illustrated in FIG. 8, the base station and the UE configure an LBT sub-frame, and a resource for LBT in the LBT sub-frame once every N sub-frames (of course, they can alternatively configure an LBT sub-frame at a varying interval, and the number of LBT sub-frames may alternatively be more than one; and the size of a Transmission Time Interval (TTI) for each UE may be less than 1, or equal to 1, or more than 1. The same will apply to all the embodiments, so a repeated description thereof will be omitted below). If an LBT mode in use is of the LBT category 2, that is, CCA detection is performed only once before a UL burst is transmitted (other access modes will not be precluded, but the method as described will be equally applicable to the other access modes of the other LBT categories than the LBT category 2), then preferably the size of the configured LBT resource may be a length of an integer number of SC-FDM symbols, or may be a length of a non-integer number of SC-FDM symbols. The position of the configured LBT resource may be located at the head of the configured LBT sub-frame, or may be located at the tail of the configured LBT sub-frame. When a UL signal is transmitted starting with the boundary of the sub-frame, the resource for LBT is preferably configured for a newly accessing UE at the tail of the LBT sub-frame, a UE transmitting a signal in the LBT sub-frame needs to stop transmitting the signal over the LBT resource configured at the tail of the sub-frame, and then all the UEs receiving successfully a UL grant corresponding to the next sub-frame perform LBT operations over the LBT resource in the corresponding LBT sub-frame, and the UE accessing the channel performs uplink transmission; and when a UL signal is transmitted starting with other than the boundary of the sub-frame, the LBT resource is preferably configured at the head of the configured LBT sub-frame, so that all the UEs scheduled successfully in the configured LBT sub-frame preferably perform LBT operations instead of transmitting any signal over the LBT resource configured at the head of the sub-frame, and the UE accessing the channel performs uplink transmission. The LBT resource may alternatively be located at another position in the configured sub-frame than the head or the tail of the LBT sub-frame.

Figure 9:
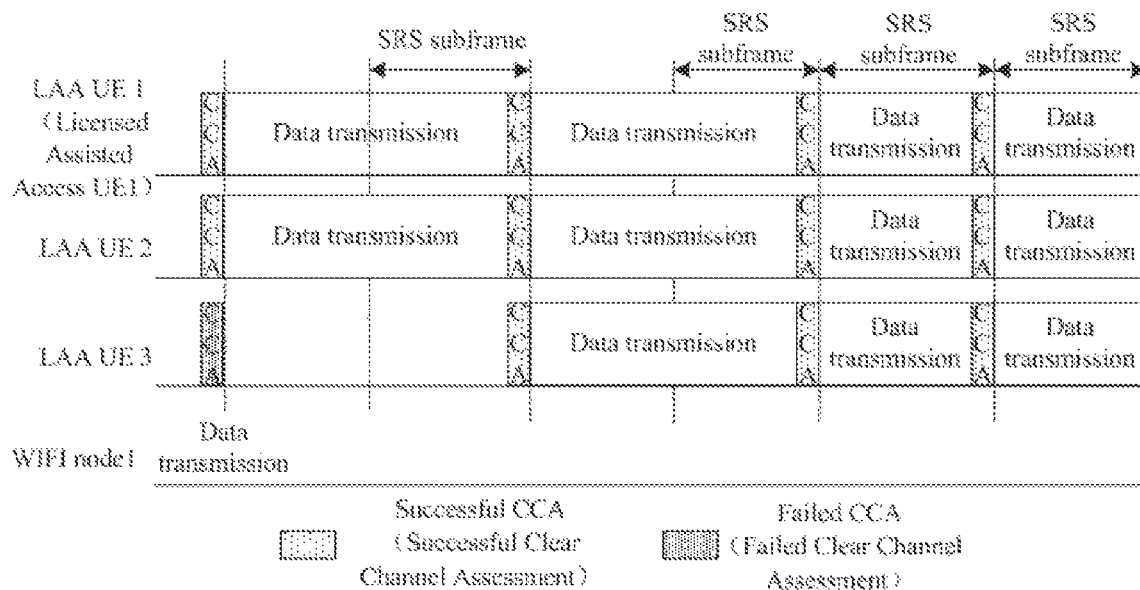
FIG. 9 is a schematic diagram of semi-statically configured resources to be reserved, according to an embodiment of the application.

In an embodiment, if the resource to be reserved in the uplink sub-frame is configured semi-statically, then the base station will indicate semi-statically via non-physical layer signaling a resource for LBT operations reserved in all of uplink sub-frames or a subset of the uplink sub-frames. Particularly the base station can configure via non-physical layer signaling an uplink sub-frame for the UE to perform LBT operations, and configure a resource (at least the position and the size thereof) for LBT in the LBT sub-frame as indicated via the non-physical layer signaling, and/or agreed on. For example, the base station can configure an LBT sub-frame, and a resource for LBT in the LBT sub-frame once every N sub-frames, or can configure an LBT sub-frame at a varying interval as needed for scheduling, and the size of the configured LBT resource may be a length of an integer number of SC-FDM symbols, or may be a length of a non-integer number of SC-FDM symbols. The position of the configured LBT resource may be located at the head of the configured LBT sub-frame, or may be located at the tail of the configured LBT sub-frame. When a UL signal is transmitted starting with the boundary of the sub-frame, the LBT resource is preferably configured at the tail of the configured LBT sub-frame, a UE transmitting a signal in the LBT sub-frame needs to stop transmitting the signal over the LBT resource configured at the tail of the sub-frame, and then all the UEs receiving successfully a UL grant corresponding to the next sub-frame perform LBT operations over the LBT resource in the configured LBT sub-frame, and the UE accessing the channel performs uplink transmission; and when a UL signal is transmitted starting with other than the boundary of the sub-frame, the LBT resource is preferably configured at the head of the configured LBT sub-frame, so that all the UEs scheduled successfully in the configured LBT sub-frame preferably perform LBT operations instead of transmitting any signal over the LBT resource configured at the head of the sub-frame, and the UE accessing the channel performs uplink transmission. The LBT resource may alternatively be located at another position in the configured sub-frame than the head or the tail of the LBT sub-frame. FIG. 9 illustrates a more particular example in which the resource to be reserved in the uplink sub-frame is configured semi-statically, and for example, if an LBT mode in use is of the LBT category 2 (other access modes will not be precluded, but the method as described will be equally applicable to the other access modes of the other LBT categories than the LBT category 2), that is, CCA detection is performed only once before a UL burst is transmitted, then the LBT sub-frame may be configured as a Sounding Reference Symbol (SRS) sub-frame via higher-layer Radio Resource Control (RRC) signaling, that is, no data will be transmitted in the last SC-FDM symbol in the LBT sub-frame, and the base station will not really schedule the SRS, that is, the LBT resource is the last SC-FDM symbol in the LBT sub-frame, and a successfully scheduled UE accesses the channel over the LBT resource.

In an embodiment, if the resource to be reserved in the uplink sub-frame is configured dynamically, then the base station will indicate dynamically via physical layer signaling a resource for LBT operations reserved in all of uplink sub-frames, or some subset of the uplink sub-frames.

In the embodiment where the resource to be reserved in the uplink sub-frame is configured dynamically, one bit is added to an UL grant to notify the UE whether to reserve a resource in a PUSCH scheduled by the UL grant (for example, a particular symbol resource to be reserved is either the last one or N symbols, or the first one or N symbols, all of these changes are applicable).

Figure 10:
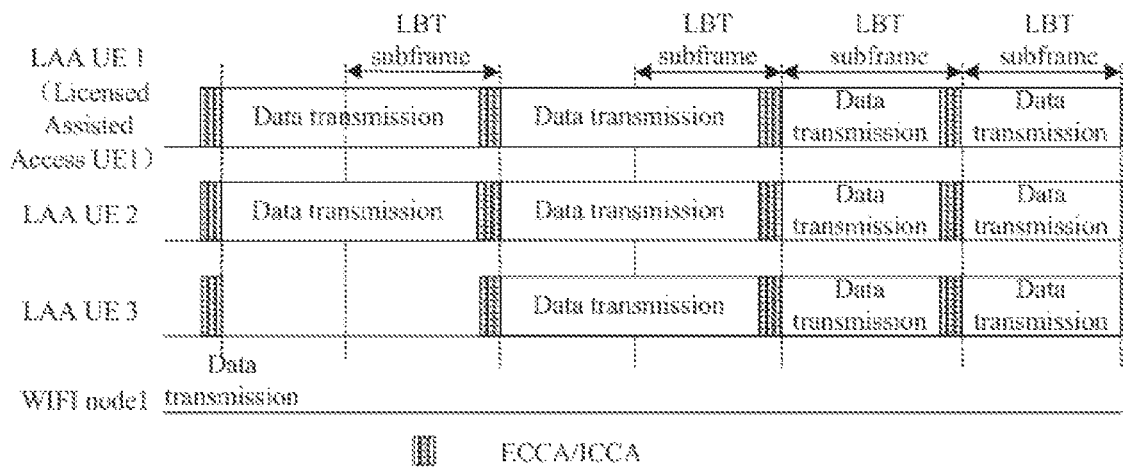
FIG. 10 is a schematic diagram of dynamically configured resources to be reserved, according to an embodiment of the application.

In a possible implementation, the base station indicates dynamically the uplink sub-frame including the resource to be reserved, via physical layer signaling, and configures the resource for LBT operations in the LBT sub-frame as indicated via the signaling, and/or agreed on. Preferably the base station indicates dynamically the uplink sub-frame including the resource to be reserved, via physical layer signaling particularly by adding one bit to a UL grant which is dynamic signaling to notify the UE whether to reserve a resource for LBT operations in a PUSCH scheduled by the UL grant. The base station configures an LBT sub-frame among UL sub-frames, and a resource for LBT in the LBT sub-frame at a fixed or varying interval as needed for scheduling, and the size of the configured LBT resource may be a length of an integer number of SC-FDM symbols, or may be a length of a non-integer number of SC-FDM symbols. The position of the configured LBT resource may be located at the head of the configured LBT sub-frame, or may be located at the tail of the configured LBT sub-frame. When a UL signal is transmitted starting with the boundary of the sub-frame, the LBT resource is preferably configured at the tail of the configured LBT sub-frame, a UE transmitting a signal in the LBT sub-frame needs to stop transmitting the signal over the LBT resource configured at the tail of the sub-frame, and then all the UEs receiving successfully a UL grant corresponding to the next sub-frame perform LBT operations over the LBT resource in the configured LBT sub-frame, and the UE accessing the channel performs uplink transmission; and when a UL signal is transmitted starting with other than the boundary of the sub-frame, the LBT resource is preferably configured at the head of the configured LBT sub-frame, so that all the UEs scheduled successfully in the configured LBT sub-frame preferably perform LBT operations instead of transmitting any signal over the LBT resource configured at the head of the sub-frame, and the UE accessing the channel performs uplink transmission. The LBT resource may alternatively be located at another position in the configured sub-frame than the head or the tail of the LBT sub-frame. FIG. 10 illustrates a more particular example in which the resource to be reserved in the uplink sub-frame is configured dynamically, and for example, if an LBT mode in use is of the LBT category 4 (other access modes will not be precluded, but the method as described will be equally applicable to the other access modes of the other LBT categories than the LBT category 4), then a desirable uplink sub-frame will be configured dynamically as an LBT sub-frame using a UL grant carried in a physical-layer PDCCH or ePDCCH; and if a signal starts with the boundary of the sub-frame, then the UL grant will indicate that, or the base station and the UE will agree on that LBT operations are performed in the last M SC-FDM symbols in the LBT sub-frame, and a successfully accessing UE will transmit a signal.

Where N and M in the embodiment of the application are preset positive integers.

Figure 11:
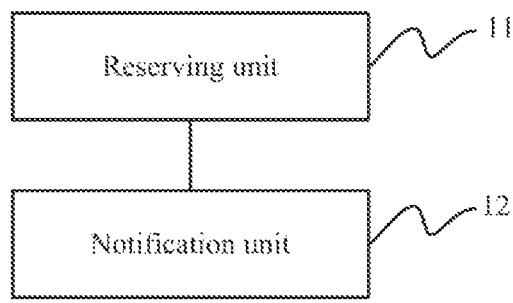
FIG. 11 is a schematic structural diagram of an apparatus for scheduling an uplink transmission resource according to an embodiment of the application.

Referring to FIG. 11, an embodiment of the application provides an apparatus for scheduling an uplink transmission resource at the base station side, where the apparatus includes: a reserving unit 11 configured to determine a resource to be reserved in an uplink sub-frame, where the resource to be reserved is a transmission resource over an unlicensed carrier; and a notification unit 12 configured to send a notification of the resource to be reserved in the uplink sub-frame to a UE.

Optionally the notification unit sends the notification of the resource to be reserved in the uplink sub-frame to the UE semi-statically or dynamically.

Optionally when the notification unit sends the notification of the resource to be reserved in the uplink sub-frame to the UE semi-statically, the notification unit sends the notification of the resource to be reserved in the uplink sub-frame to the UE via non-physical layer signaling; or when the notification unit sends the notification of the resource to be reserved in the uplink sub-frame to the UE dynamically, the notification unit sends the notification of the resource to be reserved in the uplink sub-frame to the UE via physical layer signaling.

Optionally the resource to be reserved is used for the UE to perform Listen Before Talk (LBT) operations.

Optionally the notification carries one or a combination of: an indicator that the UE needs to reserve the resource in the uplink sub-frame; the uplink sub-frame including the resource to be reserved, and the position of the resource to be reserved in the uplink sub-frame; and the size of the resource to be reserved in the uplink sub-frame including the resource to be reserved.

Optionally the resource to be reserved is located at the head or the tail of at least one uplink sub-frame.

Figure 12:
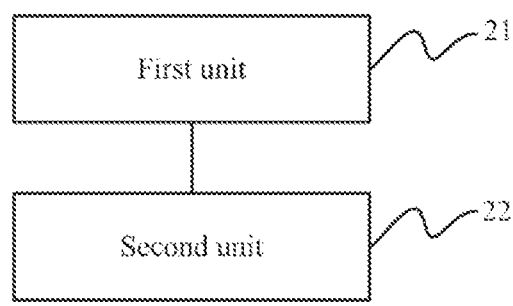
FIG. 12 is a schematic structural diagram of an apparatus for uplink transmission according to an embodiment of the application.

Referring to FIG. 12, an embodiment of the application provides an apparatus for uplink transmission at the UE side, where the apparatus includes: a first unit 21 configured to determine a resource to be reserved in an uplink sub-frame, where the resource to be reserved is a transmission resource over an unlicensed carrier; and a second unit 22 configured to decide not to transmit any uplink signal over the resource to be reserved.

Optionally the second unit is further configured: when a UE including the apparatus does not access a channel, to perform Listen Before Talk (LBT) operations over the resource to be reserved; or when a UE including the apparatus accesses the channel, to transmit an uplink signal over an uplink resource scheduled by a base station.

Optionally the resource to be reserved in the uplink sub-frame, determined by the first unit is preconfigured; or the first unit receives a notification of the resource to be reserved in the uplink sub-frame, sent semi-statically or dynamically by the base station, and determines from the notification the resource to be reserved in the uplink sub-frame.

Figure 13:
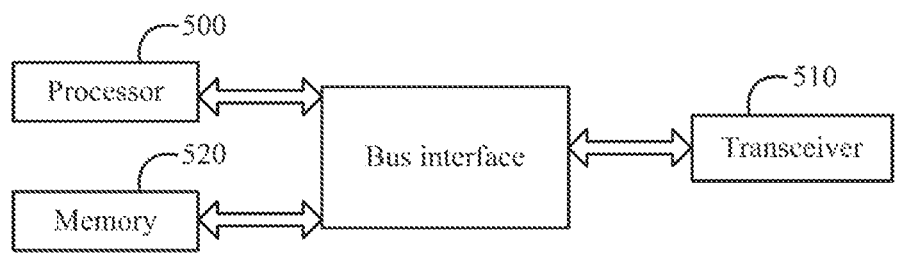
FIG. 13 is a schematic structural diagram of another apparatus for scheduling an uplink transmission resource according to an embodiment of the application.

Referring to FIG. 13, an embodiment of the application provides another apparatus for scheduling an uplink transmission resource at the base station side, where the apparatus includes: a processor 500 configured to read programs in a memory 520 to perform:determining a resource to be reserved in an uplink sub-frame, where the resource to be reserved is a transmission resource over an unlicensed carrier; and sending the notification of the resource to be reserved in the uplink sub-frame to a UE through a transceiver 510.

Optionally the processor 500 sends the notification of the resource to be reserved in the uplink sub-frame to the UE semi-statically or dynamically through the transceiver 510.

Optionally when the processor 500 sends the notification of the resource to be reserved in the uplink sub-frame to the UE semi-statically through the transceiver 510, the processor 500 sends the notification of the resource to be reserved in the uplink sub-frame to the UE via non-physical layer signaling; or when the processor 500 sends the notification of the resource to be reserved in the uplink sub-frame to the UE dynamically through the transceiver 510, the processor 500 sends the notification of the resource to be reserved in the uplink sub-frame to the UE via physical layer signaling through the transceiver 510.

Optionally the resource to be reserved is used for the UE to perform Listen Before Talk (LBT) operations.

Optionally the notification carries one or a combination of: an indicator that the UE needs to reserve the resource in the uplink sub-frame; the uplink sub-frame including the resource to be reserved, and the position of the resource to be reserved in the uplink sub-frame; and the size of the resource to be reserved in the uplink sub-frame including the resource to be reserved.

Optionally the resource to be reserved is located at the head or the tail of at least one uplink sub-frame.

The transceiver 510 is configured to be controlled by the processor 500 to receive and transmit data.

Here in FIG. 13, the bus architecture can include any number of interconnecting buses and bridges to particularly link together various circuits including one or more processors represented by the processor 500, and one or more memories represented by the memory 520. The bus architecture can further link together various other circuits, e.g., peripheral devices, manostats, power management circuits, etc., all of which are well known in the art, so a further description thereof will be omitted in this context. The bus interface serves as an interface. The transceiver 510 can be a number of elements including a transmitter and a receiver which are units for communication with various other devices over a transmission medium. The processor 500 is responsible for managing the bus architecture and performing normal processes, and the memory 520 can store data for use by the processor 500 in performing the operations.

Figure 14:
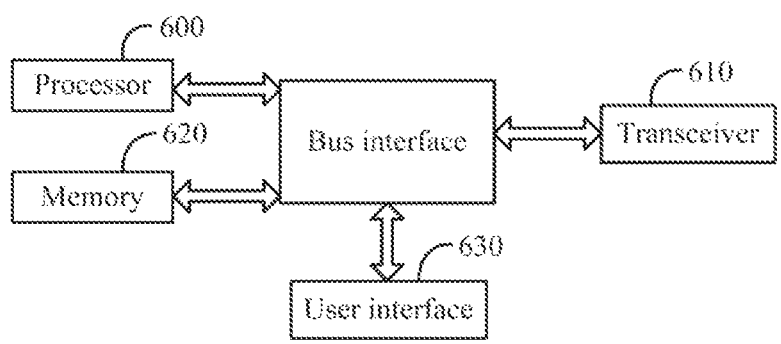
FIG. 14 is a schematic structural diagram of another apparatus for uplink transmission according to an embodiment of the application.

Referring to FIG. 14, an embodiment of the application provides another apparatus for uplink transmission at the UE side, where the apparatus includes: a processor 600 configured to read programs in a memory 620 to perform: determining a resource to be reserved in an uplink sub-frame, where the resource to be reserved is a transmission resource over an unlicensed carrier; and deciding not to transmit any uplink signal over the resource to be reserved.

Optionally the processor 600 is further configured: when a UE including the apparatus does not access a channel, to perform Listen Before Talk (LBT) operations over the resource to be reserved; or when a UE including the apparatus accesses the channel, to transmit an uplink signal over an uplink resource scheduled by a base station.

Optionally the resource to be reserved in the uplink sub-frame, determined by the processor 600 is preconfigured; or the processor 600 receives a notification of the resource to be reserved in the uplink sub-frame, sent semi-statically or dynamically by the base station through the transceiver 610, and determines from the notification the resource to be reserved in the uplink sub-frame.

The transceiver 610 is configured to be controlled by the processor 500 to receive and transmit data.

Here in FIG. 14, the bus architecture can include any number of interconnecting buses and bridges to particularly link together various circuits including one or more processors represented by the processor 600, and one or more memories represented by the memory 620. The bus architecture can further link together various other circuits, e.g., peripheral devices, manostats, power management circuits, etc., all of which are well known in the art, so a further description thereof will be omitted in this context. The bus interface serves as an interface. The transceiver 610 can be a number of elements including a transmitter and a receiver which are units for communication with various other devices over a transmission medium. For different user equipments, a user interface 630 can also be an interface via which desirable devices can be connected internally or externally, and the connected devices can include but will not be limited to a keypad, a display, a speaker, a microphone, a joystick, etc.

The processor 600 is responsible for managing the bus architecture and performing normal processes, and the memory 620 can store data for use by the processor 500 in performing the operations.

In summary, in UL transmission in the LTE-U system, for the sake of flexible scheduling, there is such a scenario that the UEs need to operate in the time division multiplexing mode, the maximum channel occupied time which is particularly allowed is short, and there are a large number of UL sub-frames. If a UE receiving a UL grant does not access the channel, then it will perform LBT operations before transmitting uplink data. However a UE accessing the channel and transmitting a signal may block the other UE from accessing, so the base station needs to configure the UE with a sub-frame and an LBT resource for LBT operations, no matter whatever position of the LBT resource in the LBT sub-frame. However, there has been absent in the prior art a specific solution, while with the technical solution provided by the embodiment of the application, the uplink transmission resource over the unlicensed carrier can be accessed in a time division multiplexing mode.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

What is claimed is:

1. A method for scheduling an uplink transmission resource, the method comprising:
   determining, by a base station, a Listen Before Talk (LBT) resource over an unlicensed carrier in an uplink sub-frame, the LBT resource is used for a first user equipment that has not accessed a channel, to perform LBT operations; and
   notifying explicitly, by the base station, a second user equipment that has accessed the channel of not transmitting any uplink signal over the LBT resource, by sending a notification of the LBT resource to the second user equipment via a UL grant, wherein the LBT resource is located in the last one or N symbols, or the first one or N symbols of the uplink sub-frame, and N is an integer greater than 1.

2. The method according to claim 1, wherein the base station sends the notification of the LBT resource in the uplink sub-frame to the second user equipment semi-statically or dynamically.

3. The method according to claim 2, wherein sending, by the base station, the notification of the LBT resource in the uplink sub-frame to the second user equipment comprises:
   when the base station sends the notification of the LBT resource in the uplink sub-frame to the second user equipment semi-statically, sending, by the base station, the notification of the LBT resource in the uplink sub-frame to the second user equipment via non-physical layer signaling; or
   when the base station sends the notification of the LBT resource in the uplink sub-frame to the second user equipment dynamically, sending, by the base station, the notification of the LBT resource in the uplink sub-frame to the second user equipment via physical layer signaling.

4. The method according to claim 1, wherein the notification carries one or a combination of:
   an indicator that the second user equipment needs to reserve the resource in the uplink sub-frame;
   the uplink sub-frame comprising the LBT resource, and a position of the LBT resource in the uplink sub-frame; and
   a size of the LBT resource in the uplink sub-frame comprising the LBT resource.

5. A method for uplink transmission, the method comprising:
   receiving, by a second user equipment that has accessed a channel, a notification of a Listen Before Talk (LBT) resource over an unlicensed carrier in an uplink sub-frame, notified by a base station explicitly via a UL grant, wherein the LBT resource is located in the last one or N symbols, or the first one or N symbols of the uplink sub-frame, and N is an integer greater than 1;
   determining, by the second user equipment, the LBT resource in the uplink sub-frame according to the notification, the LBT resource is used for a first user equipment that has not accessed the channel, to perform LBT operations;
   not transmitting, by the second user equipment, any uplink signal over the LBT resource; and
   transmitting, by the second user equipment, uplink signals over resources other than the LBT resource in the uplink-sub-frame.

6. The method according to claim 5, wherein the LBT resource in the uplink sub-frame, is preconfigured; or
   the second user equipment, receives the notification of the LBT resource in the uplink sub-frame, sent semi-statically or dynamically by the base station, and determines from the notification the LBT resource in the uplink sub-frame.

7. An apparatus for scheduling an uplink transmission resource, the apparatus comprising:
   a memory storing computer programs, a transceiver and a processor; and
   the processor configured to read the computer programs in the memory to perform operations comprising:
   determine a Listen Before Talk (LBT) resource over an unlicensed carrier in an uplink sub-frame, wherein the LBT resource is used for a first user equipment that has not accessed a channel to perform LBT operations; and
   notify explicitly a second user equipment that has accessed the channel of not transmitting any uplink signal over the LBT resource, by sending a notification of the LBT resource to the second user equipment via a UL grant, wherein the LBT resource is located in the last one or N symbols, or the first one or N symbols of the uplink sub-frame, and N is an integer greater than 1.

8. The apparatus according to claim 7, wherein the processor is further configured to read the computer programs in the memory to:
   send the notification of the LBT resource in the uplink sub-frame to the second user equipment semi-statically or dynamically.

9. The apparatus according to claim 8, wherein the processor is further configured to read the computer programs in the memory to:
   when the notification of the LBT resource in the uplink sub-frame is sent to the second user equipment semi-statically, send the notification of the LBT resource in the uplink sub-frame to the second user equipment via non-physical layer signaling; or
   when the notification of the LBT resource in the uplink sub-frame is sent to the second user equipment dynamically, send the notification of the LBT resource in the uplink sub-frame to the second user equipment via physical layer signaling.

10. The apparatus according to claim 7, wherein the notification carries one or a combination of:
    an indicator that the second user equipment needs to reserve the resource in the uplink sub-frame;
    the uplink sub-frame comprising the LBT resource, and a position of the LBT resource in the uplink sub-frame; and
    a size of the LBT resource in the uplink sub-frame comprising the LBT resource.

11. The apparatus according to claim 7, wherein the LBT resource is located at a head or a tail of at least one uplink sub-frame.

12. A method for uplink transmission, the method comprising:
- receiving, by a second user equipment that has accessed a channel after listen before talk (LBT) operations, a notification of a LBT resource over an unlicensed carrier in an uplink sub-frame, notified by a base station explicitly via a UL grant, the LBT resource used for a first user equipment that desires to send uplink signals and has not accessed the channel, to perform the LBT operations, and the LBT resource is located in the last one or N symbols, or the first one or N symbols of the uplink sub-frame, and N is an integer greater than 1;
- transmitting, by the second user equipment, uplink signals over resources other than the LBT resource in the uplink sub-frame;
- determining, by the first user equipment, that the channel is clear by performing the LBT operations on the LBT resource; and
- accessing, by the first user equipment, the channel.

* * * * *